C. SEMMLER.
RECOVERING THE WASTE HEAT OF SMELTERS AND KINDRED PLANTS.
APPLICATION FILED DEC. 9, 1913.
1,151,831.
Patented Aug. 31, 1915.
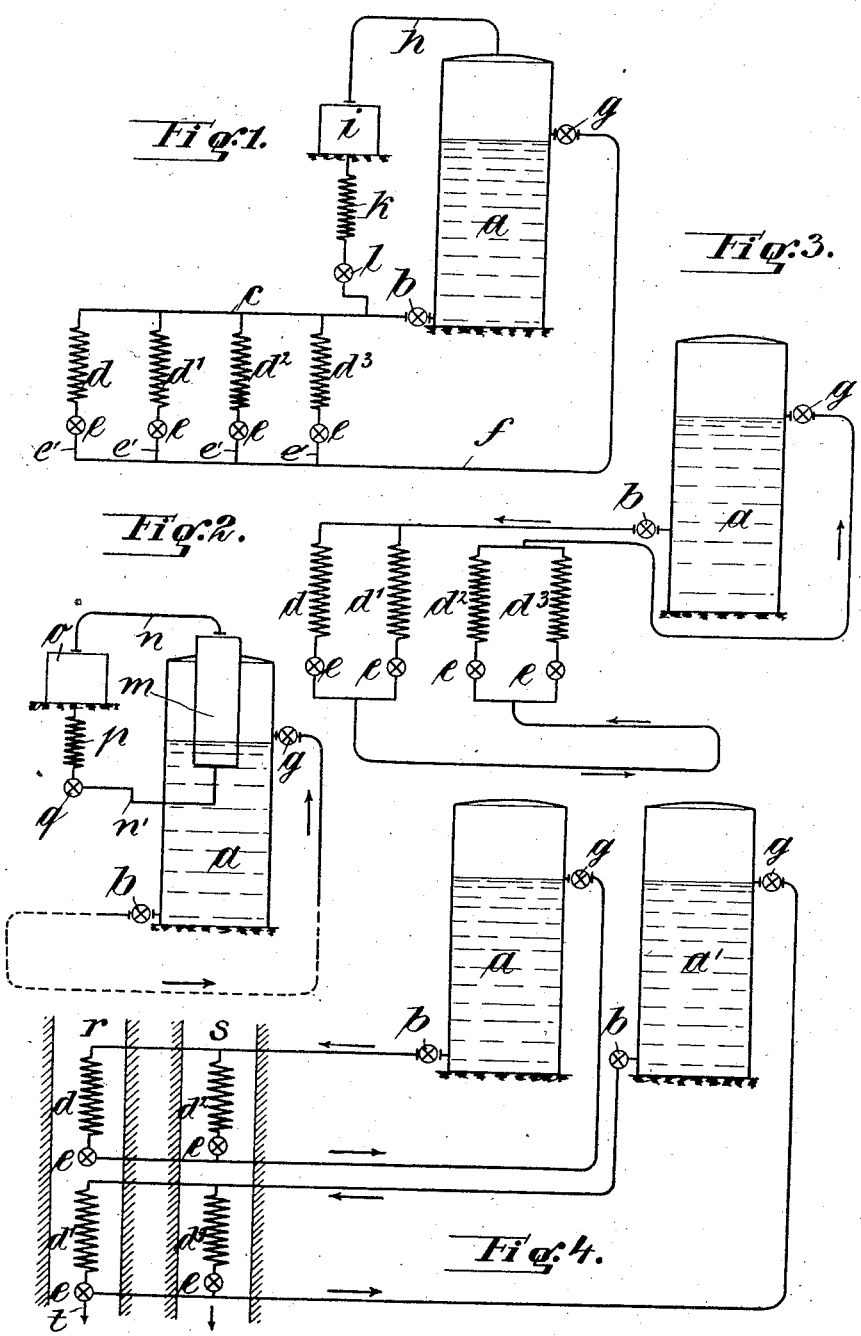

UNITED STATES PATENT OFFICE.

CARL SEMMLER, OF WIESBADEN, GERMANY.

RECOVERING THE WASTE HEAT OF SMELTERS AND KINDRED PLANTS.

1,151,831.

Specification of Letters Patent.

Patented Aug. 31, 1915.

Application filed December 9, 1913. Serial No. 805,531.

*To all whom it may concern:*

Be it known that I, CARL SEMMLER, a citizen of the German Empire, residing at Wiesbaden, Germany, have invented new and useful Improvements in Recovering the Waste Heat of Smelters and Kindred Plants, of which the following is a specification.

This invention relates to a novel method or system of utilizing the waste heat inherent in the by-products, etc., of smelters and kindred plants, such as the heat of blast furnaces and other gases.

With the methods hitherto known, the gases emanating from blast furnaces have been employed for driving gas engines, or boilers have been built into the exhaust gas passages. These methods however, did not fulfil their purpose because the various gases and other products generated in smelters and similar plants, yield their inherent heat but irregularly. With an iron plant of considerable size, the available quantity of heat depends largely upon the operation of the blast furnaces. If one of the several heat sources of different kind, for instance the gas supply to the engines, fails partially or totally, the waste heat of the coke plant may be substituted. Thus with the present invention an economical recovery of the waste heat is rendered feasible because a plurality of heat sources of different kinds react upon a common heat absorbing medium such as distilled water, for which purpose said medium is made to traverse the different heat recovering appliances in series or in parallel. After this medium has thus absorbed the heat of all such appliances, it is conveyed to an accumulator in which vaporization takes place.

As in this accumulator, the waste heat of a plurality of heat sources of different kinds, is collected, it does not matter if one of said sources fails temporarily, so that a substantially uniform heat supply is stored in said accumulator, which in turn warrants a constant operation of the steam engine or other heat consuming appliance coupled to said accumulator. The heat absorbing medium or heat carrier consists preferably of distilled water to prevent the formation of heat-insulating incrustations or other deposits, said carrier being sent through the several heat exchanging apparatus with such a speed and under such a pressure that the formation of steam within such apparatus is effectively prevented. In this way, even relatively high temperatures may be profitably utilized because the heat transfer effects a thorough cooling of the several hot media. The pressure of the heat carrier is finally relieved within the accumulator, to here cause a lively generation of steam which may be employed for driving an engine and for heating or other purposes. The heat carrier which describes a cycle may also be utilized to heat a heat absorbing medium of a second cycle such as cold vapor fluids for driving turbines, etc.

My novel method has the important advantage that temperatures which vary within a wide range may be utilized. Thus the high temperatured heat sources may collectively influence a first cycle of a heat carrier while the heat sources of lower temperature may be united to influence one or more other cycles, which cycles may include separate heat accumulators. Owing to this graduation of the heat sources with respect to their temperatures, a most economical operation of the heat recovery system is attained, because the heat carrier my be preheated in a cycle of low temperatured apparatus to be subsequently subjected to the action of a cycle of higher temperatured apparatus, etc.

In order to prevent the heat carrier in lieu of passing through the accumulator, from circulating between two heat yielding apparatus which should have like temperatures but have in fact different temperatures, the several branches of the heat carrier are provided with pressure regulating means, so that this carrier must invariably circulate through the accumulator. It is also necessary to provide a check valve for the heat carrier conduit in front of the accumulator, to prevent a generation of steam in said conduit.

In the accompanying drawing: Figure 1 is a diagrammatical view of a heat recovery plant embodying my invention, and Figs. 2 to 4 are modifications thereof.

The letter $a$ indicates the heat accumulator communicating near its bottom with a pump $b$ adapted to force the liquid heat carrier into a conduit $c$. The latter communicates in turn with a plurality of heat transferring apparatus $d$, $d^1$, $d^2$, $d^3$, which may be respectively heated by the waste heat of a Cowper apparatus, flue gases, a forge, and the coke quenching water. These apparatus are through branches $e^1$ controlled by valves $e$, connected to a return conduit $f$ controlled by check valve $g$. After the heated carrier has passed through valve $g$, its pressure is relieved so that a lively generation of steam will take place within accumulator $a$. This steam is conveyed through pipe $h$ to an engine or other steam consuming apparatus $i$, while the condensate gathering in condenser $k$ is by pump $l$ conveyed into conduit $c$, so that in this way a complete cycle of the heat carrying medium is established.

With the construction shown in Fig. 2, accumulator $a$ contains a vaporizer $m$ which is heated by the heat carrier passing through the accumulator. Vaporizer $m$ contains preferably a cold vapor fluid which is conveyed through pipe $n$ to a cold vapor engine $o$, the condensate collecting in condenser $p$ being, by pump $q$, and pipe $n^1$ returned to the vaporizer. With this device the check valve $g$ may be omitted in case the temperature is below 100° centigrade.

Fig. 3 illustrates a plant in which the heat recovery is effected stepwise, by sending the heat carrier through heat transfer apparatus $d$, $d^1$ and then through apparatus $d^2$, $d^3$ to be further heated. In some cases the parts $d$ and $d^1$, may for instance be arranged within a Cowper apparatus $r$, while the parts $d^2$, $d^3$ are installed within a heating flue $s$. The apparatus $d$, $d^2$ are jointly connected to a first accumulator $a$, and the apparatus $d^1$, $d^3$ are jointly connected to a second accumulator $a^1$ (Fig. 4), whereby the arrangement is such, that apparatus $d$ is subjected to a higher temperature than apparatus $d^1$ owing to the flow of the heat yielding medium in the direction of arrow $t$. In this way, accumulator $a$ receives a temperature that is higher than that of accumulator $a^1$. It is thus obvious that the heat transfer apparatus and the accumulators may be combined in such a manner that even small quantities of heat may be completely recovered in an economical manner, without in any way impairing the uniformity and safety of the heat recovery system.

I claim:

System of recovering waste heat, comprising a heat-accumulator adapted to contain a liquid heat-absorbing medium, a plurality of heat-yielding devices that are adapted to receive their heat from independent sources of different kinds, a first conduit connecting the lower portion of the accumulator with all of said heat-yielding devices, a pump forming part of said first conduit and adapted to convey the liquid heat-absorbing medium from the accumulator to the heat yielding devices, a second conduit connecting all of said heat-yielding devices with the upper portion of said heat-accumulator, and a check valve forming part of said second conduit and located in proximity to the accumulator, said check valve preventing vaporization of the heated medium during its passage through the second conduit.

CARL SEMMLER.

Witnesses:
WOLDEMAR HAUPT,
HENRY HASPER.